July 8, 1958     W. S. SLATOSKI     2,842,118
MORTAR HEATER
Filed Oct. 1, 1953
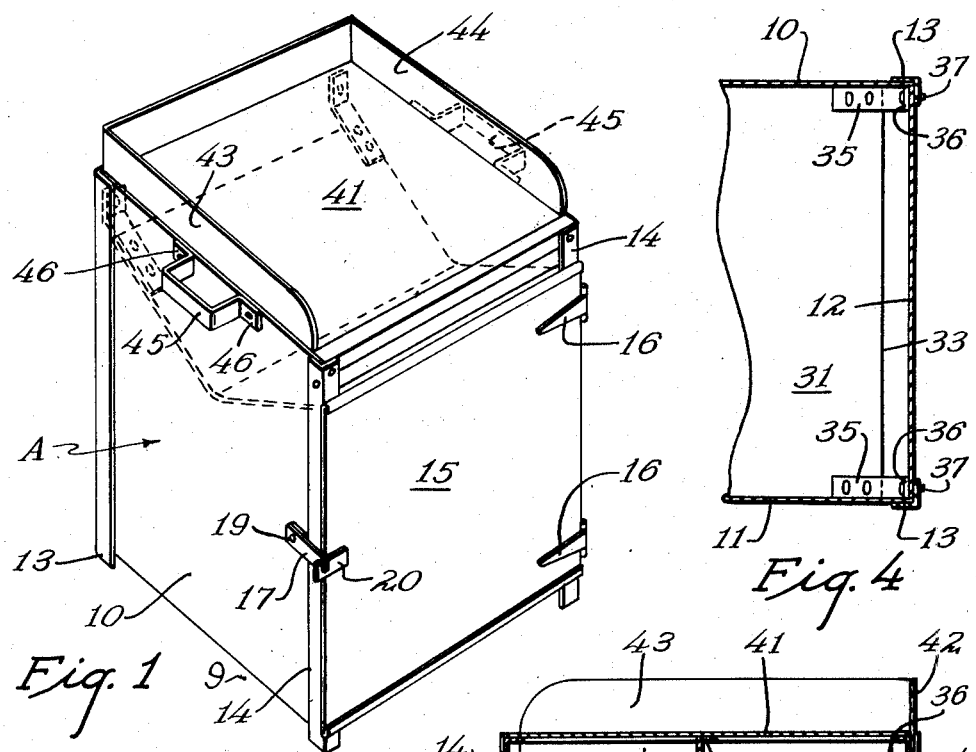
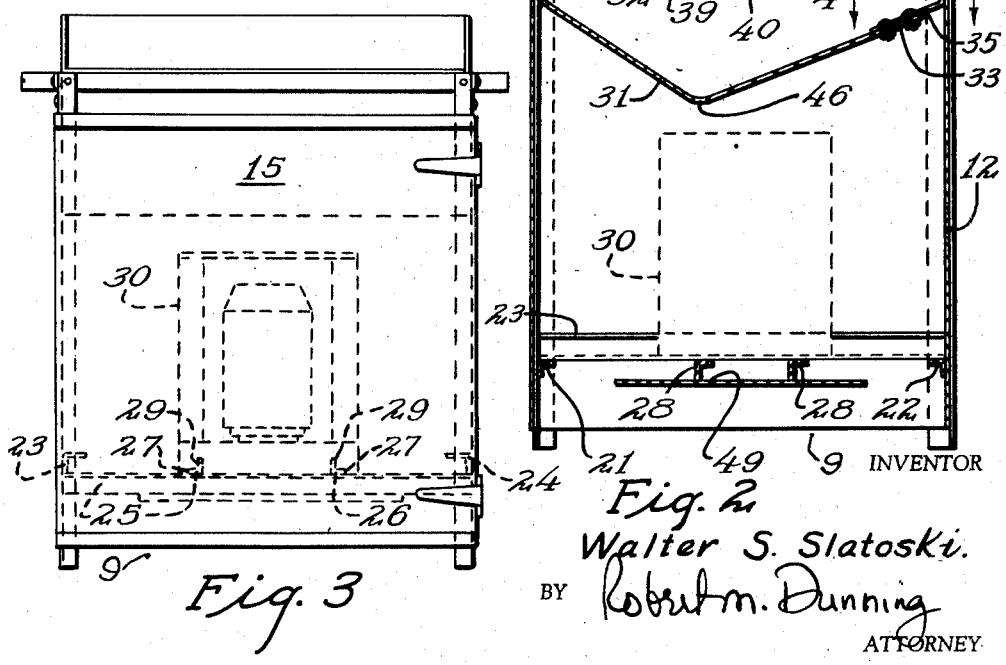
INVENTOR
Walter S. Slatoski.
BY Robert M. Dunning
ATTORNEY

United States Patent Office 2,842,118
Patented July 8, 1958

2,842,118

MORTAR HEATER

Walter S. Slatoski, St. Paul, Minn.

Application October 1, 1953, Serial No. 383,608

5 Claims. (Cl. 126—345)

This invention relates to an improvement in mortar heaters and deals particularly with an apparatus for maintaining mortar in a good working condition in cold weather.

When using mortar out of doors in cold weather considerable difficulty is experienced in maintaining the mortar at a proper consistency. If mortar is supported in the usual way it becomes extremely stiff and hard to work with. Similarly if the mortar is heated by the usual heating means it is difficult to handle and dries quickly. A purpose of the present invention is to avoid these difficulties which are usually experienced.

An object of the present invention resides in the provision of a heating cabinet designed to accommodate a kerosene heater or the like. Baffle means are provided to spread the heated air, heated by this heater, beneath a shelf or plate on which the mortar may rest. The mortar is, therefore, readily accessible for use. At the same time it is uniformly heated by a gentle heat which will permit the mortar to be readily used and at the same time will not dry out the mortar quickly.

A feature of the present invention resides in the provision of a cabinet having a baffle therein which tends to maintain an even temperature in the under portion of the structure. This baffle preferably extends almost from the front to the back of the heating cabinet so as to restrict the escape of the heated air. The heated air is released at a point beneath the mortar supporting plate which is opposite the outlet. Thus in order to rise and to circulate the heated air must travel throughout substantially the whole area of the mortar supporting plate.

A feature of the present invention resides in the provision of a mortar heater which is portable and which is of relatively small size and of low weight. As a result the heater may be placed upon a platform or scaffold if necessary in order to hold the mortar in the proper condition and where it is relatively easily accessible to the workmen.

A feature of the present invention resides in the provision of a mortar heater having a flat plate like top on which the mortar is supported. This top is provided with upwardly extending edges encircling three sides of the plate. Accordingly the mortar is readily confined onto the heated surface and may be readily removed through the use of a trowel or the like.

A further feature of the present invention resides in the provision of a mortar heater having a heating unit which is removable. This is of advantage in transporting the device because the weight may be divided. Furthermore, it simplifies the operation of replenishing the heater with fuel. The heater may be easily removed from the heating cabinet and filled in the usual manner.

A further feature of the present invention resides in the provision of a cabinet having side walls arranged in generally rectangular relation and supporting a plate upon which the mortar may be placed. A baffle is supported between the walls and this baffle is preferably V-shaped in section. The baffle is positioned directly over the heater and divides the heated air passing upwardly from the heater. An opening, or series of openings, are provided along one edge of the baffle adjoining one of the side walls. The opposite side wall is provided with an air escape opening forming the only means of escape of the air. The heater air which is trapped on one side of the baffle not having the opening assists in maintaining an even temperature in the air passing beneath the plate.

These and other objects and novel features of my invention will be more clearly and fully set forth in the following specification and claims.

In the drawings forming a part of my specification:

Figure 1 is a perspective view of the mortar heater showing my construction.

Figure 2 is a cross sectional view, the section being taken on a plane vertically through the front and back of the heater cabinet.

Figure 3 is a front elevational view of the heating unit.

Figure 4 is a sectional view through a portion of the cabinet, the position of the section being indicated by the line 4—4 of Figure 2.

The mortar heater is indicated in general in the drawings by the letter A. As indicated the heater includes a generally rectangular cabinet including side walls 10 and 11, and a rear panel 12. Angle iron frame members 13 are provided at the juncture of the side panels with the rear panel as shown in Figures 1 and 4. The angles 13 extend below the lower edges of at least one of the side and rear panels and form legs for supporting the cabinet. The space beneath the panels forms an air inlet passage or opening, as indicated at 9.

Angle iron legs 14 are also provided at the juncture of the side panels 10 and 11 and the front wall of the cabinet. These angles 14 also extend below the level of the side and rear wall panels to form supporting legs. A front panel 15 is hingedly attached by hinges 16 to one of the legs or angle members 14. A hook shaped swinging latch 17 is pivoted at 19 to one side panel 10 and is engageable in a keeper 20. When engaged, the latch holds the door 15 in closed position. When in closed position the front panel 15 is spaced from the lower ends of the supporting legs 14 and the upper edge of the door panel is also supported slightly beneath the upper ends of these angle members 14.

A pair of angle members 21 and 22 extend across the front and rear sides of the cabinet body in order to form a reinforcing frame for properly spacing the corner members. Similar angle iron members 23 and 24 extend along the side wall panels between the corner members 14 and 13 and are secured thereto. These angles 21, 22, 23, and 24, form a generally rectangular reinforcing frame near the lower end of the body. An additional pair of parallel spaced angles 25 and 26 extend from front to rear of the cabinet between the side panels thereof. These angles each include a horizontal flange 27 and a vertical flange 29. These angles 25 and 26 are designed to support a heater 30 of any suitable design. They are reinforced by laterally extending angles 28. As the outer casing of the heater 30 is of somewhat larger diameter than the space between the angle members 25 and 26, the vertical flanges 29 are cut away or notched to accommodate this heater body. As a result the notched angles form a support for the heater which holds the same from lateral movement in any direction. As indicated in Figures 2 and 3 of the drawings the heater is centrally positioned within the cabinet.

A baffle 31 is formed which is generally V-shaped in cross section, the V being very shallow. An angle member 32 extends transversely between the front corner angles 14 and the forward edge of the baffle 31 is connected to the angle 32 for support thereby. A rear edge 33 of the baffle 31 terminates short of the rear wall panel 12 as is best indicated in Figures 2 and 4 of the drawings. Straps 35 are riveted, or bolted, through the rear edge of the baffle 31 and include an upwardly extending extremity 36 which is bolted or otherwise secured to the rear panel 12 and to the angles 13 by bolts 37.

A rectangular frame 39 of angle iron or the like is provided near the upper ends of the side and rear wall panels. The frame 39 is provided with a transversely extending cross brace 40. A top panel 41 rests upon a rectangular frame 39 and is supported thereby. In the particular form of construction illustrated, the rear panel 12 extends upwardly above the plate 41 to form a rim portion 42. Also, in the particular form of construction illustrated rim sides 43 and 44 are secured to the sides of the frame 39 inwardly of the upper edges of the side panels 10 and 11 respectively to form a means of preventing the mortar from falling or being pushed from the plate 41. If preferred, the rim sides 43 and 44 may form extensions of the side panels 10 and 11 rather than separate pieces.

Generally U-shaped strapped handles 45 are provided on opposite sides of the cabinet, being secured outwardly of the side panels 10 and 11. These strap handles 45 are provided with outwardly extending anchoring flanges 46 on opposite sides thereof which are attached through the side panels 10 and 11 to the rectangular frame 39.

While the device thus described is extremely simple in nature it is unusually effective for its intended purpose. The heat from the heater 30 tends to rise upwardly from the heater. A plate 49 beneath the angles 28 limits the incoming air and prevents air from striking the heater 30 directly. The baffle 31 having its apex 47 directly over the heater tends to divide the air flowing upwardly, a portion of the heater air passing on either side of this apex. The apex 47 is spaced forwardly from the cabinet center. The smaller portion of the heated air which passes upwardly on the forward side of the apex acts to heat the forward portion of the baffle due to the fact that the heat is somewhat confined in this area. As the air cools it is replaced by warmer air thereby providing a slow circulation beneath the forward portion of the baffle.

The greater volume of heated air traveling below the rear portion of the baffle is guided by the baffle to the open space between the rear edge of the baffle and the rear wall panel 12. The heat then rises beneath the mortar supporting plate 41. Due to the fact that the plate 41 is substantially horizontal in position the travel of the heated air beneath this plate remains relatively slow. As the heated air transfers some of its heat to the plate 41 it travels nearer and nearer to the forward portion of the baffle 31 which provides additional heat. In other words the baffle 31 by its shape tends to reheat the air as it loses its heat and thereby assists in maintaining an even temperature throughout the entire plate 41.

In actual tests it is found that the temperature of the plate 41 throughout its area is unusually uniform. Mortar which is placed on the plate 41 is heated sufficiently to maintain it in a good plastic workable condition. At the same time the indirect heat transmitted to the plate is not sufficient to dry the mortar to any undesirable degree. But using the present heater the mortar may be maintained in a proper state even in relatively low temperatures. In climates where temperatures well below the freezing point are often experienced for considerable periods of time the heated mortar is applied without difficulty.

In accordance with the patent statutes I have described the principles of construction and operation of my mortar heater and while I have endeavored to set forth the best embodiment thereof I desire to have it understood that obvious changes may be made within the scope of the following claims without departing from the spirit of my invention.

I claim:

1. A mortar heater including a generally rectangular cabinet having four rectangularly arranged side walls, at least one of the said side walls providing an air inlet opening at the lower end thereof, a heater unit within said cabinet, a generally V-shaped baffle extending between two opposite walls, one straight edge of the V-shaped baffle being connected to a third wall and the opposite straight edge of the baffle being spaced from the opposite wall with the apex of said baffle being displaced in relationship to the center of the said cabinet, a generally horizontal mortar supporting plate above said baffle and forming a top closure for the walls, said cabinet having an outlet opening therein above said baffle in the cabinet wall to which the first mentioned straight edge of the baffle is secured.

2. The structure described in claim 1, and including an upwardly projecting rim extending about three sides of the mortar supporting plate.

3. A mortar heater including a generally rectangular cabinet having four rectangularly arranged side walls, at least one of the side walls providing an air inlet at the lower end thereof, a heater unit within said cabinet, a generally V-shaped baffle extending between two opposite walls, one straight edge of the V-shaped baffle being connected to a third wall and the opposite straight edge of the baffle being spaced from the opposite wall, a generally horizontal mortar supporting plate above said baffle and forming a top closure for the walls, said cabinet having an outlet opening therein above said baffle and in said third wall.

4. A mortar heater including a cabinet having enclosing rectangularly arranged walls providing an inlet opening into the cabinet near the lower end thereof, a heater unit within said cabinet, a generally V-shaped baffle within said cabinet connecting two opposed of said walls and having its apex in close proximity to said heater unit, said baffle having one straight edge connected to a third of said walls, the baffle thus forming a seal with the walls except along the other straight edge of the V-shaped baffle, this other straight edge of the baffle being spaced from the fourth wall of the cabinet to form a heated air passage, a mortar supporting plate forming a top closure for the cabinet walls above said baffle, and said cabinet having an outlet opening above said baffle adjoining said one straight edge of the V-shaped baffle.

5. The construction described in claim 4 and including a rim extending around three sides only of said mortar supporting plate.

References Cited in the file of this patent

UNITED STATES PATENTS

| 375,109 | Warren | Dec. 20, 1887 |
| 680,487 | Kinnare | Aug. 13, 1901 |
| 760,430 | Daniel | May 24, 1904 |
| 1,288,310 | Waddill | Dec. 17, 1918 |
| 1,392,181 | Lacy | Sept. 27, 1921 |
| 2,307,465 | Muszynski | Jan. 5, 1943 |